US007218692B2

(12) United States Patent
Dabak et al.

(10) Patent No.: US 7,218,692 B2
(45) Date of Patent: May 15, 2007

(54) MULTI-PATH INTERFERENCE CANCELLATION FOR TRANSMIT DIVERSITY

(75) Inventors: Anand G. Dabak, Plano, TX (US); Eko N. Onggosanusi, Allen, TX (US); Timothy M. Schmidl, Dallas, TX (US); Aris Papasakellariou, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 575 days.

(21) Appl. No.: 10/172,843

(22) Filed: Jun. 17, 2002

(65) Prior Publication Data

US 2003/0002568 A1   Jan. 2, 2003

Related U.S. Application Data

(60) Provisional application No. 60/298,784, filed on Jun. 15, 2001.

(51) Int. Cl.
*H03D 1/04* (2006.01)

(52) U.S. Cl. .................................................... 375/346
(58) Field of Classification Search ........ 375/260–262, 375/265, 267, 285, 341, 346–350, 148; 455/63.1, 455/65, 132, 137, 269, 272; 370/334–335, 370/342, 350

See application file for complete search history.

(56) References Cited

U.S. PATENT DOCUMENTS

| 6,353,911 | B1 * | 3/2002 | Brink | 714/780 |
| 6,584,593 | B1 * | 6/2003 | Seshadri et al. | 714/752 |
| 6,700,926 | B1 * | 3/2004 | Heikkila et al. | 375/221 |
| 6,891,897 | B1 * | 5/2005 | Bevan et al. | 375/265 |
| 2002/0172265 | A1 * | 11/2002 | Kenney | 375/148 |

* cited by examiner

*Primary Examiner*—Khanh Tran
(74) *Attorney, Agent, or Firm*—Ronald O. Neerings; Wade James Brady, III (57) ABSTRACT

The present invention provides an apparatus, system and method for removal of interference due to multi-path for multiple transmit antennas (hereinafter referred to as MTA-MPIC) for High Speed Downlink Packet Access (HSDPA) encoded for transmit diversity, such as Space-Time Transmit Diversity (STTD). For a single receive antenna, the signal is received (25) and each multi-path delayed signal is demodulated (21). The demodulation can include long code removal and despreading. Subsequently, each demodulated signal is received by the RAKE receiver (22) for determining the channel estimate and channel normalization for the total HSDPA signal, and for computing space-time decoding for the HSDPA signal. Following the space-time decoding, a data decision is made (23). Next, reconstructed interference signals are generated (24) and combined with the received signal (25). For other user signals, an interference estimate is made from the despreader (322) outputs without applying the RAKE/space-time coding operations.

23 Claims, 6 Drawing Sheets

FIG. 4B FROM FIG. 4A

FIG. 6B FROM FIG. 6A

FIG. 6A

MULTI-PATH INTERFERENCE CANCELLATION FOR TRANSMIT DIVERSITY

This application claims the priority under 35 U.S.C. 119(e)(1) of copending U.S. provisional application No. 60/298,784, filed on Jun. 15, 2001, and incorporated herein by reference.

BACKGROUND OF THE INVENTION

1. Technical Field of the Invention

The present invention relates to wireless telecommunications and, more particularly, to multi-path interference cancellation in a high speed data system using transmit diversity.

2. Description of Related Art

A phenomena that reduces the efficiency of a communications link is fading. Fading may take several forms, one of which is referred to as multi-path fading. Multi-path fading is caused by two or more copies of a transmitted signal combining at the receiver in a way that reduces the overall received signal level. One technique developed for reducing the effects of fading is transmit diversity. Generally, for transmit diversity, a radio transmitter uses two transmit antennas that are positioned far from each other to transmit one signal. Typically, the two transmit antennas are positioned more than several wavelengths of the transmitted signal from each other depending upon the environment.

For example, in the well known Space-Time Transmit Diversity (STTD) system, symbols S1 and S2 are received for transmission at the transmitter encoder in which S1 is received during the period from T0 to T1 and S2 is received during the period from T1 to T2. At a first output of the encoder, S1 is output for transmission to a first antenna during the symbol time from T1 to T1, followed by symbol S2 from symbol time T1 to T2. A second output of the encoder outputs the negative complex conjugate of symbol S2 for transmission to a second antenna during time T0 to T1, followed by the complex conjugate of symbol S1 from the period T1 to T2.

Another improvement, known as High Speed Downlink Packet Access (HSDPA), has been developed to enhance mobile services for high-speed data users. HSDPA takes advantage of link adaptation such as adaptive modulation and coding to enhance data rates to data users in a time-multiplexed manner. HSDPA is specified by in Third Generation Partnership Project (3GPP); Technical Specification Group Radio Access Network; Physical layer aspects of UTRA High Speed Downlink Packet Access (Release 4), the description of which is hereby incorporated by reference. The outcome of the 3GPP work is a set of specifications defining the 3G-network functionality, procedures and service aspects. HSDPA transmissions are performed on physical channels shared by other users generally employing different spreading gains. The HSDPA channels employ a spreading gain of 16 and voice users, for example, typically employ a spreading gain of 64.

HSDPA can be transmitted in a transmit diversity manner with other user transmissions. However, some conventional signal processing methods cannot be used for receivers of HSDPA data encoded in a transmit diversity scheme and, thus innovative processing methods must be developed.

For example, HSDPA can be encoded for STTD transmission on a shared channel with voice users in which the voice users may or may not be STTD encoded. In either case, however, because the spreading gain of the voice users is different from the HSDPA channels, the effective channel seen by the voice users is different from the channel seen by the HSDPA users. If STTD encoded according to Third Generation Partnership Project (3GPP); Technical Specification Group Radio Access Network; Physical channels and mapping of transport channels onto physical channels (FDD) (Release 1999), the description of which is hereby incorporated by reference, the STTD encoded data itself does not see a time invariant channel and, thus chip level equalization cannot be employed to remove the multi-path interference.

SUMMARY OF THE INVENTION

The present invention achieves technical advantages as an apparatus, system and method for multi-path interference cancellation for high speed data signals encoded for transmit diversity. Interference cancellation is implemented using the spreading gain of the high speed data signal, such as the spreading gain of 16 typically used for High Speed Downlink Packet Access (HSDPA). Even though the spreading gain of other user channels are 64 or greater, the root code of length 16 from these codes can be employed for linear interference cancellation. Hence, interference cancellation is implemented with a spreading gain of HSDPA, which is only length 16. Alternatively, despreading of length 64 is implemented for the voice users when the mobile receiver has the requisite knowledge of voice users transmitting. For systems with 2 receive antennas, MTA-MPIC can also differentiate between the other users being transmitted on the multiple transmit antennas. Thus, for 2 receive antennas, MTA-MPIC can also perform a MIMO type interference cancellation for the other users.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Throughout the drawings, it is noted that the same reference numerals or letters will be used to designate like or equivalent elements having the same function. Detailed descriptions of known functions and constructions unnecessarily obscuring the subject matter of the present invention have been omitted for clarity.

Figure 1A:
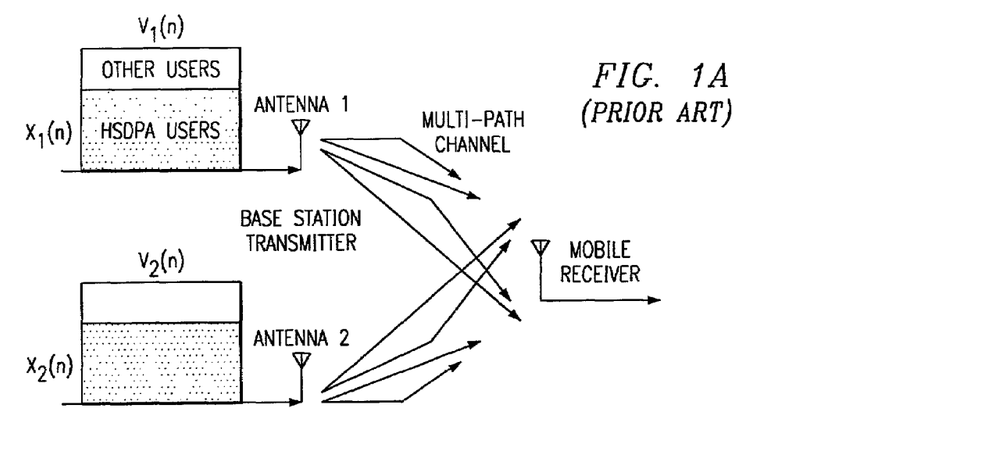
FIG. 1A illustrates a HSDPA/transmit diversity system.
Figure 1B:
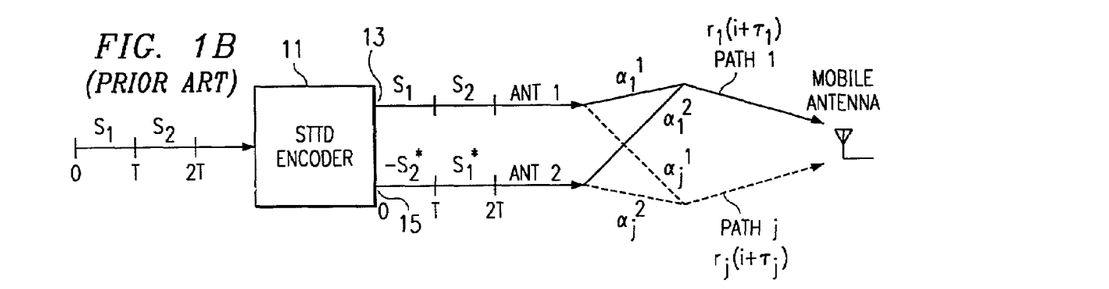
FIG. 1B illustrates STTD encoding according to release '99 for HSDPA channels.

FIG. 1B is a simple illustration of STTD encoding according to release '99 for HSDPA channels. Symbols S1 and S2 are received for transmission at the transmitter encoder 11 in which S1 is received during the period from T0 to T1 and S2 is received during the period from T1 to T2. At a first output 13 of the encoder, S1 is output for transmission to a first antenna during the symbol time from T1 to T1, followed by symbol S2 from symbol time T1 to T2. A second output 15 of the encoder outputs the negative complex conjugate of symbol S2 for transmission to a second antenna during time T1 to T1, followed by the complex conjugate of symbol S1 from the period T1 to T2.

Referring now to FIG. 1A there is illustrated a HSDPA/transmit diversity system in which desired HSDPA channels and other users, such as control and voice users, are code multiplexed for transmission and the HSDPA channels are transmit diversity encoded. Data stream $X_1(n)$ comprises the HSDPA channels for antenna 1 with a spreading gain of 16 and voice and other users $V_1(n)$ which may have a spreading gain larger than 16. Since the HSDPA channels are transmit diversity encoded, the HSDPA data stream on antenna 2 is written by $X_2(n)$. The other user channels which may or may not be transmit diversity encoded are given by the data stream $V_1(n)$ on antenna 1. The data stream $X_1(n)$ is given by the following;

$$X_1(n) = \sum_{m=1}^{M} C^m(n) S_1^m(n) \qquad \text{Equation 1}$$

Where $C^m(n)$ is the spreading code chip for the $m^{th}$ user at time n including the long code and the Walsh code and $S_1^m(n)$ is the symbol value of the $m^{th}$ user at time n on antenna 1.

The data stream for other users on antenna 2, $V_2(n)$, is related to the data stream $V_1(n)$ on antenna 1. The relation depends upon the spreading gain of the other users which is typically greater than a spreading gain of 16. For example, the spreading gain is typically 64 for voice users but it can be different for other applications. The relationship of $V_2(n)$ with $V_1(n)$ further depends upon the type of transmit diversity encoding used, whether open loop encoding (i.e., STTD encoding) or closed loop encoding is being employed on $V_1(n)$. Hence, in general, the HSDPA is not able to find out the exact relationship of $V_2(n)$ with respect to $V_1(n)$. Therefore, the other user data stream $V_2(n)$ on antenna 2 should be considered independent from the data stream $V_1(n)$ on antenna 1 at the mobile receiver. The data stream $X_2(n)$, which comprises the HSDPA channels and the voice and other users $V_2(n)$, is given by the following;

$$X_2(n) = \sum_{m=1}^{M} C^m(n) S_2^m(n) \qquad \text{Equation 2}$$

Where $C^m(n)$ is the spreading code chip for the $m^{th}$ user at time n including the long code and the Walsh code and $S_2^m(n)$ is the symbol value of the $m^{th}$ user at time n on antenna 2. The spreading code employed by both the antennas is the same hence it is denoted by the same spreading sequence $C^m(n)$.

As above-mentioned, HSDPA channels are transmit diversity encoded and employ a spreading gain of 16 whereas voice users typically employ a spreading gain of 64 and may or may not be transmit diversity encoded. In either case, because the spreading gain of the voice users is different from the HSDPA channels, the effective channel seen by the voice users is different from the channel seen by the HSDPA users. More particularly, if STTD encoded according to release 99, the STTD encoded data itself does not see a time invariant channel. This means conventional chip level equalization cannot be employed in a mobile receiver to remove multi-path interference at the receiver.

Figure 1C:
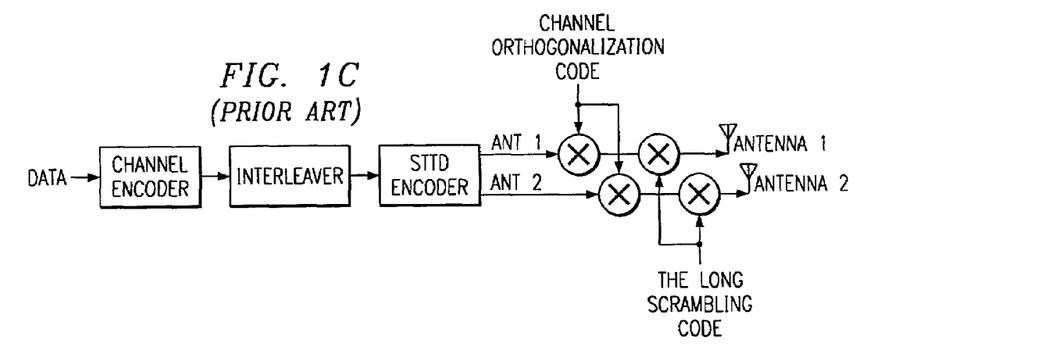
FIG. 1C illustrates STTD encoding combined with orthogonal code spreading.

FIG. 1C illustrates a conventional example of the use of STTD in combination with orthogonal spreading codes (corresponding generally to $C^m(n)$ above) such as used in conventional CDMA systems.

The present invention uses multi-path interference cancellation, instead of equalization techniques, to remove the interference due to multi-path for multiple transmit antennas (hereinafter referred to as MTA-MPIC). An advantage of MTA-MPIC is that even though the spreading gain of voice users is 64, a linear decision can be made on them using a simple spreading of only length 16. For spreading gains of other channels at 64 or greater, the root code of length 16 from these codes is used for linear interference cancellation. Hence, it is possible to implement the interference cancellation with a spreading gain of HSDPA, which is only length 16. Alternatively, despreading of length 64 is implemented for the voice users for example, when the mobile receiver has the knowledge of which voice users are transmitting. In equations 1 and 2 without loss of generality let m=1 to m= $\tilde{M}$<M be the codes allocated to the HSDPA users. Then the HSDPA signals $S_1^m(n)$, $S_2^m(n)$; m<$\tilde{M}$ can be space time (ST) encoded as shown in FIGS. 1B and 1C.

Letting $T_c$ be the chip period, the spreading gain for the HSDPA users is given by K=T/$T_c$. Letting $\alpha_j^1$ and $\alpha_j^2$ be the fading parameters from the two antennas respectively for the $j^{th}$ path the net received signal at the mobile after the receive matched filter is given by;

$$r(n) = \sum_{j=1}^{L} (\alpha_j^1 X_1(n - \tau_j T_c) + \alpha_j^2 X_2(n - \tau_j T_c)) \qquad \text{Equation 3}$$

Where $\tau_j$ is an integer and it indicates the delay of the $j^{th}$ multi-path from the transmitter to the mobile. For simplicity of analysis we have assumed that the different multi-path delays are integer multiples of the chip width $T_c$. The receiver structure does not significantly change when in reality the multi-path delays are not integer multiples of the chip widths. Now letting $$r_j(n) = (\alpha_j^1 X_1(n - \tau_j T_c) + \alpha_j^2 X_2(n - \tau_j T_c))$$ Equation 4 and substituting Equation 4 into equation 3 one gets;

$$r(n) = \sum_{j=1}^{L} r_j(n).$$ Equation 5

For multiple receive antenna systems, such as a two receive antenna systems, MTA-MPIC can also differentiate between the other users being transmitted on the two transmit antennas. Thus, for two receive antennas, MTA-MPIC can also perform a MIMO type interference cancellation for the other users.

Figure 2:
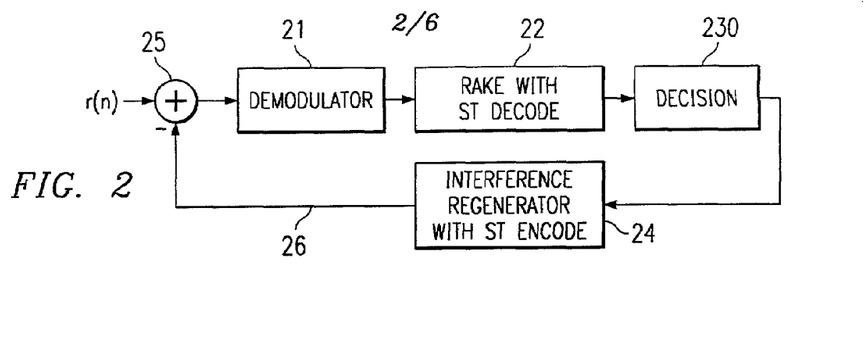
FIG. 2 shows a simple block diagram illustrating MTA-MPIC with one receive antenna and a HSDPA data user.

Referring now to FIG. 2 there is shown a simple block diagram illustrating an embodiment of MTA-MPIC with one receive antenna and a HSDPA data user encoded for space-time transmit diversity. Initially, the signal is received at input 25 and each multi-path delayed signal is demodulated at unit 21. Demodulator 21 can include long code removal and Walsh-Hadamard transform (WHT) despreading. Subsequently, each demodulated signal is received by the RAKE receiver 22. The RAKE receiver 22 computes channel estimates and performs space-time decoding. Following the space-time decoding, at 230, channel normalization is performed with respect to the HSDPA signals, and data decisions are made. Next, reconstructed interference signals corresponding to the space-time encoded HSDPA signals are generated by interference regenerator 24 in response to the decisions made at 23. These interference signals 26 are combined with the received signal at a summing node 25 for interference cancellation. This procedure of demodulating the signal, rake, decision and canceling the multi-path interference can be repeated multiple times. Typical applications will do 2–3 iterations of the above procedure.

Figure 3:
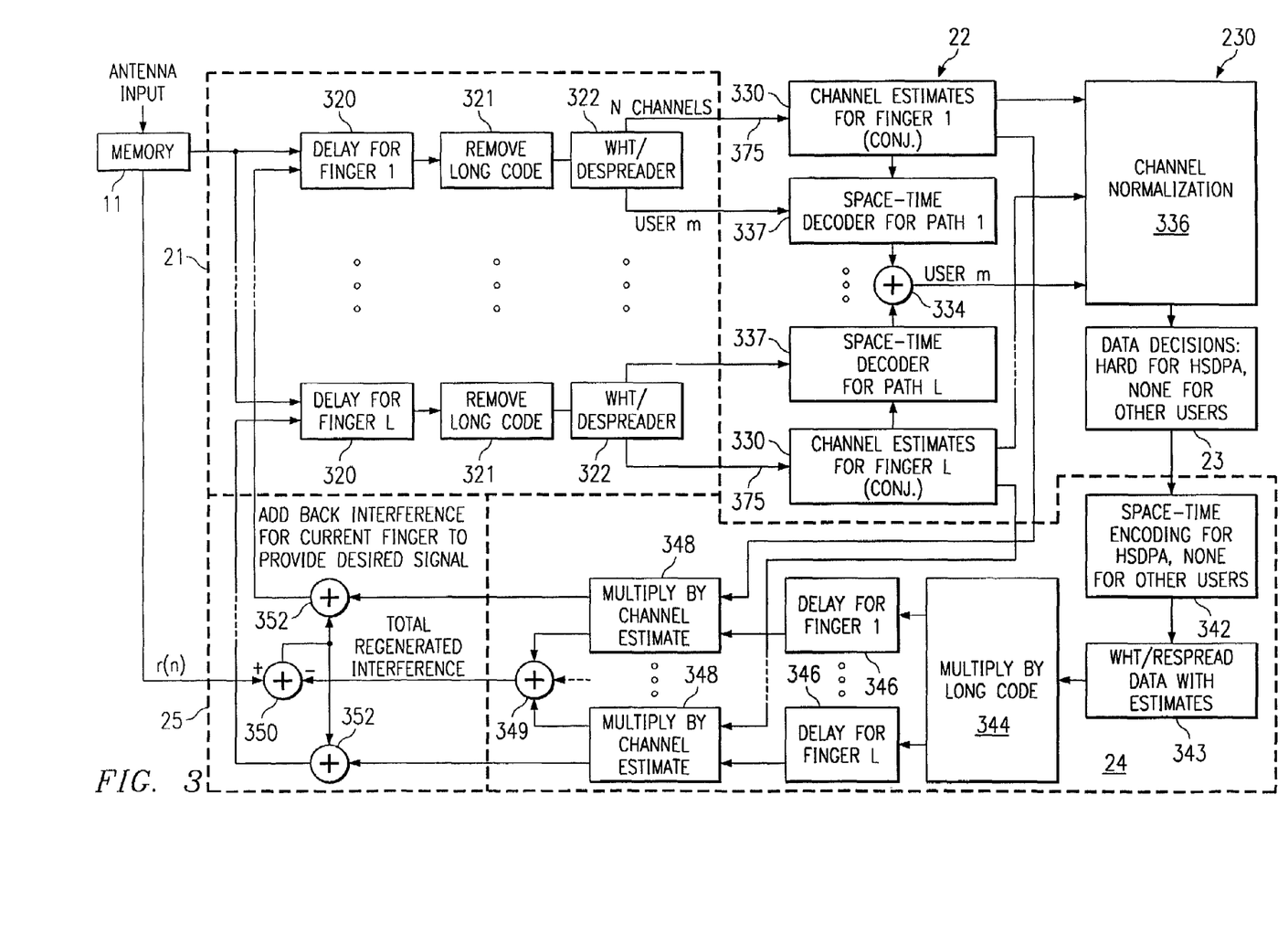
FIG. 3 shows a more detailed block diagram illustrating MTA-MPIC for the case of one receive antenna in which other user interference is not canceled.

Referring now to FIG. 3 there is shown a more detailed block diagram illustrating MTA-MPIC for the case of one receive antenna. The HSDPA signal is received from the antenna at input 11 and demodulated at 21. Each multi-path finger for the HSDPA signal is delayed by an appropriate respective offset for synchronization by delay units 320 in which the received signal is delayed on the $j^{th}$ path. Subsequently, any long coding is removed by units 321 for each finger. Following long code removal, the WHT despreader units 322 remove (i.e. despreads) the signal spreading codes. It is not necessary to have the Walsh code despreader for the individual codes. In general one could separate the long code despreader and the Walsh Hadamard despreader into two separate blocks. However, in order to reduce the complexity of the receiver WHT is employed to despread the Walsh codes, particularly when the number of HSDPA codes exceeds four. The combination of the long code despreader 321 and the WHT 322 effectively achieves the operation of, $$R_j^m(i) = \sum_{n=iK+1}^{n=(i+1)K} C^m(n) r(n - \tau_j T_c)$$ Equation 6 where the code $C^m(n)$ is multiplied to the received signal and summed over the spreading gain of the HSDPA channel, and i denotes a symbol. Note that even though the other release'99 voice and other channels may have a spreading gain greater than the gain of the HSDPA channel they are also spread with the same spreading gain of the HSDPA channel only. This is done in order to reduce the complexity of the receiver of not requiring it to despread all the other channels with their large spreading gains. Without loss of generality it is assumed in equation 6 that i is an even integer.

Following demodulation 21, the signals are received for a RAKE process 22. Conventional conjugate (channel estimation) units 330 compute the channel estimate conjugate of the signals received from the despreader units 322. Each WHT despreader 322 provides training channel information at 375 for conventional use by the corresponding channel estimation unit 330. Each space-time decoder 337, for path j, does the following space-time decoding for HSDPA code $m < \tilde{M}$.

$$\hat{S}_1^m(j) = R_j^m(i)[\alpha_j^1]^* + (R_j^m(i+1))^* \alpha_j^2$$

$$\hat{S}_2^m(j) = -(R_j^m(i))^* \alpha_j^2 + R_j^m(i+1)[\alpha_j^1]^*$$ Equation 7

The soft decisions for each of the symbols are now summed at adder 334 to produce;

$$\hat{S}_1^m = \sum_{j=1}^{L} \hat{S}_1^m(j); \hat{S}_2^m = \sum_{j=1}^{L} \hat{S}_2^m(j)$$

These summation results are input to a conventional channel normalization unit 336, together with conventional channel estimate information from channel estimators 330. Following channel normalization, a data decision is made at decision unit 23. The decision unit 23 can either be a soft decision or a hard decision unit. The soft decision unit employs the soft decisions in the equation given above to generate the interference. The hard decision unit makes a hard decision on the bits of whether they are +/−1, using the soft decision as the input, depending upon whether it is a QPSK modulation or a 16 QAM modulation or some other modulation. Next, a reconstructed interference signal is generated at 24 for each finger beginning with HSDPA space-time encoding by encoding unit 342. Subsequently, the signal is respread using WHT by unit 343 and multiplied by the long code by unit 344. The signal is then delayed by the respective finger delays at delay units 346. Each respective finger signal is next multiplied at 348 by the associated HSDPA channel estimate information received from channel estimate units 330. Similar to equations 1 and 2, the estimated symbols for the HSDPA users are now ST encoded and respread, and the result is:

$$\hat{X}_1(n) = \sum_{m=1}^{\tilde{M}} C^m(n) \hat{S}_1^m(n)$$ Equation 8 and $$\hat{X}_2(n) = \sum_{m=1}^{\tilde{M}} C^m(n) \hat{S}_2^m(n)$$ Equation 9

A total regenerated interference is summed by adder 349. For a given received finger the regenerated interference is now given by;

$$I_l(n) = \sum_{j=1, j \neq l}^{L} \left( \alpha_j^1 \hat{X}_1(n - \tau_j T_c) + \alpha_j^2 \hat{X}_2(n - \tau_j T_c) \right) \quad \text{Equation 10}$$

As can be seen from the above equation, the interference for a given finger involves adding the estimate of the signals for the rest of the fingers. The operation of equation 10 can be realized by first adding all the signals at 349, then subtracting the result from r(n) at 350, and, lastly, summing the resultant of adder 350 with the respective regenerated interference signals at adders 352 to add back interference for each of the fingers to provide the individual finger signals. Thus, the adders at 349, 350 and 352 produce:

$$r_l(n) = r(n) - I_l(n) \quad \text{Equation 11}$$

The above signal is now despread and space-time decoded again at 321, 322 and 337, and the result is in turn used to regenerate a new estimate of the interference. The above procedure is repeated 2–3 times in some example embodiments to improve upon the interference estimate and the performance of the receiver.

Figure 4A:
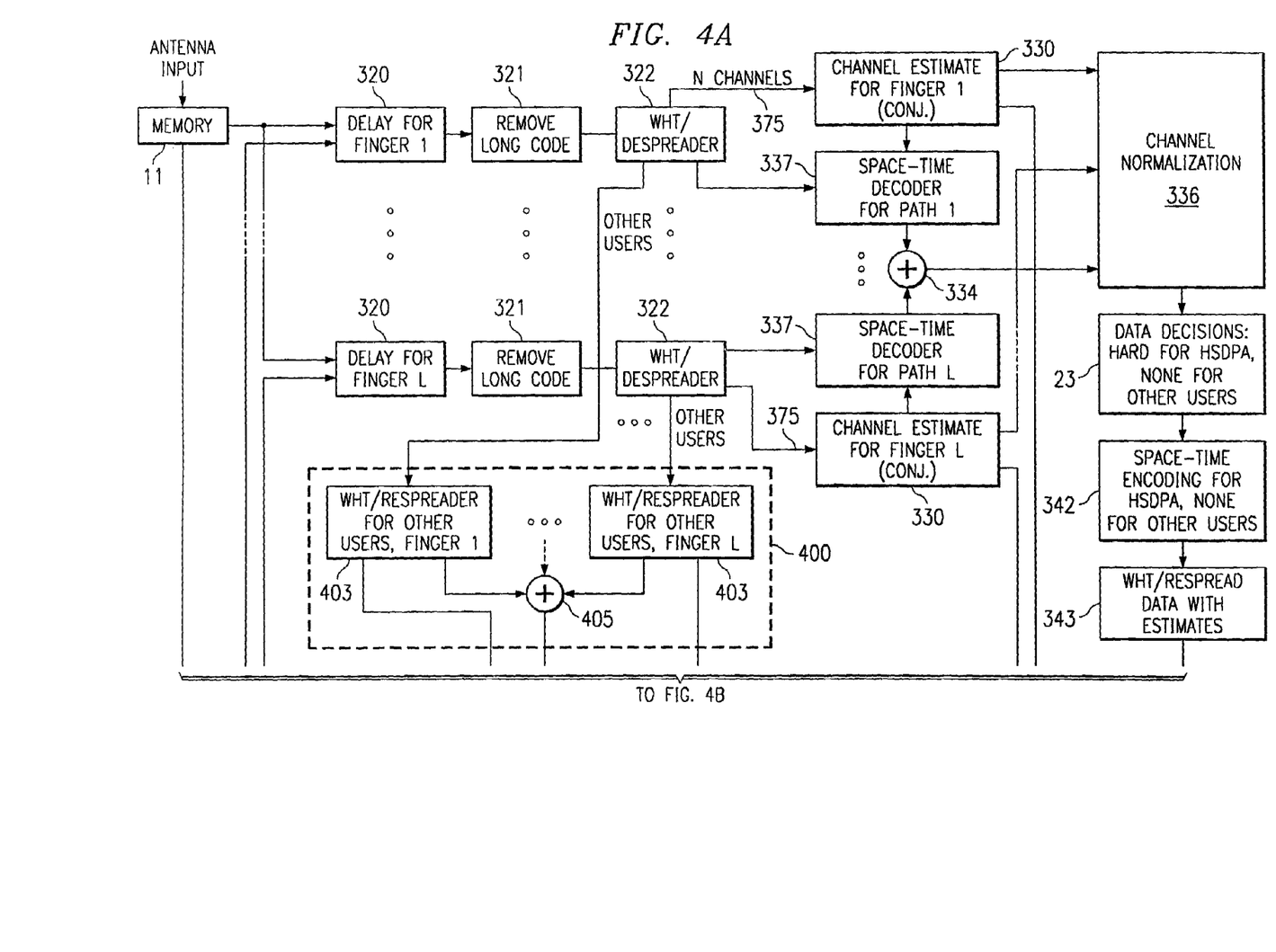
FIG. 4 illustrates an alternative embodiment for MTA-MPIC with one receive antenna and a HSDPA data user in which other user interference can be canceled on a per "finger" basis.
Figure 4B:
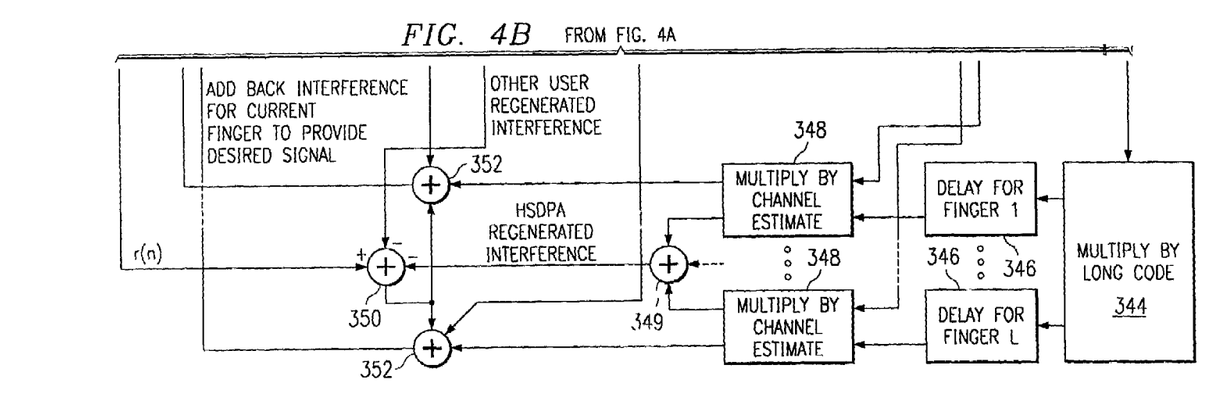

An alternative embodiment for the one receive antenna case is illustrated in FIG. 4. In this embodiment, it is assumed that codes other than for HSDPA are being used (such as for voice users) and they are unknown to the receiver. Since the signal contribution of other users from the transmit antennas are considered to be independent signals, they cannot be discriminated individually using a single receive antenna without knowledge of the code and/or transmit scheme. This is why the FIG. 3 embodiment treats the other users as interference and does not cancel them. The interference cancellation in FIG. 3 only cancels the multipath interference due to HSDPA channels. In the exemplary embodiment of FIG. 4, an interference estimate for other (e.g. voice) users is made by directly employing the despreader outputs. That is, instead of applying RAKE/space-time decoding to all the user signals, the other users are tapped before the full combining is determined, as shown at 400 in FIG. 4.

The approach illustrated in FIG. 4 is similar to that illustrated in FIG. 3 in all respects except that channels other than the HSDPA are tapped before the full combining is determined in the RAKE process 22. The other users are tapped at the WHT despreaders 322 for each delay finger. This other user despreading can be done using those codes (of gain 16 in this example) that are not used by the HSDPA users. Additional despreading (not explicitly shown) can subsequently be applied. For example, voice users can have additional despreading by a factor of four, since voice users are typically employed with a spreading gain of 64 (i.e., 4×16=64).

Subsequently, the other user signals are respread at WHT respreaders 403 and an associated total regenerated interference is summed by adder 405 and then subtracted, along with the HSDPA regenerated interference, from the initial received signal by adder 350. Lastly, the resultant of adder 350 is summed with the respective regenerated interference signals at adders 352 to add back interference from the other users and HSDPA for the fingers to provide the desired signals. Thus, for the other users, an interference estimate is made by directly employing the despreader outputs $R_j^m(i)$ (see equation 6). The regenerated interference for the voice users or the other channels is now given by;

$$\tilde{I}_l(n) = \sum_{j=1, j \neq l}^{L} \sum_{m=\tilde{M}+1}^{M} C^m(n) R_j^m(n). \quad \text{Equation 12}$$

Equation 12 can thus be used to calculate the interference from other users by using the despreader outputs directly for the other users. The regenerated interference is now subtracted out from the received signal (see 349, 350 and 352 of FIG. 4), so the individual finger signals are given by;

$$\tilde{r}_l(n) = r(n) - I_l(n) - \tilde{I}_l(n). \quad \text{Equation 13}$$

Figure 6A:
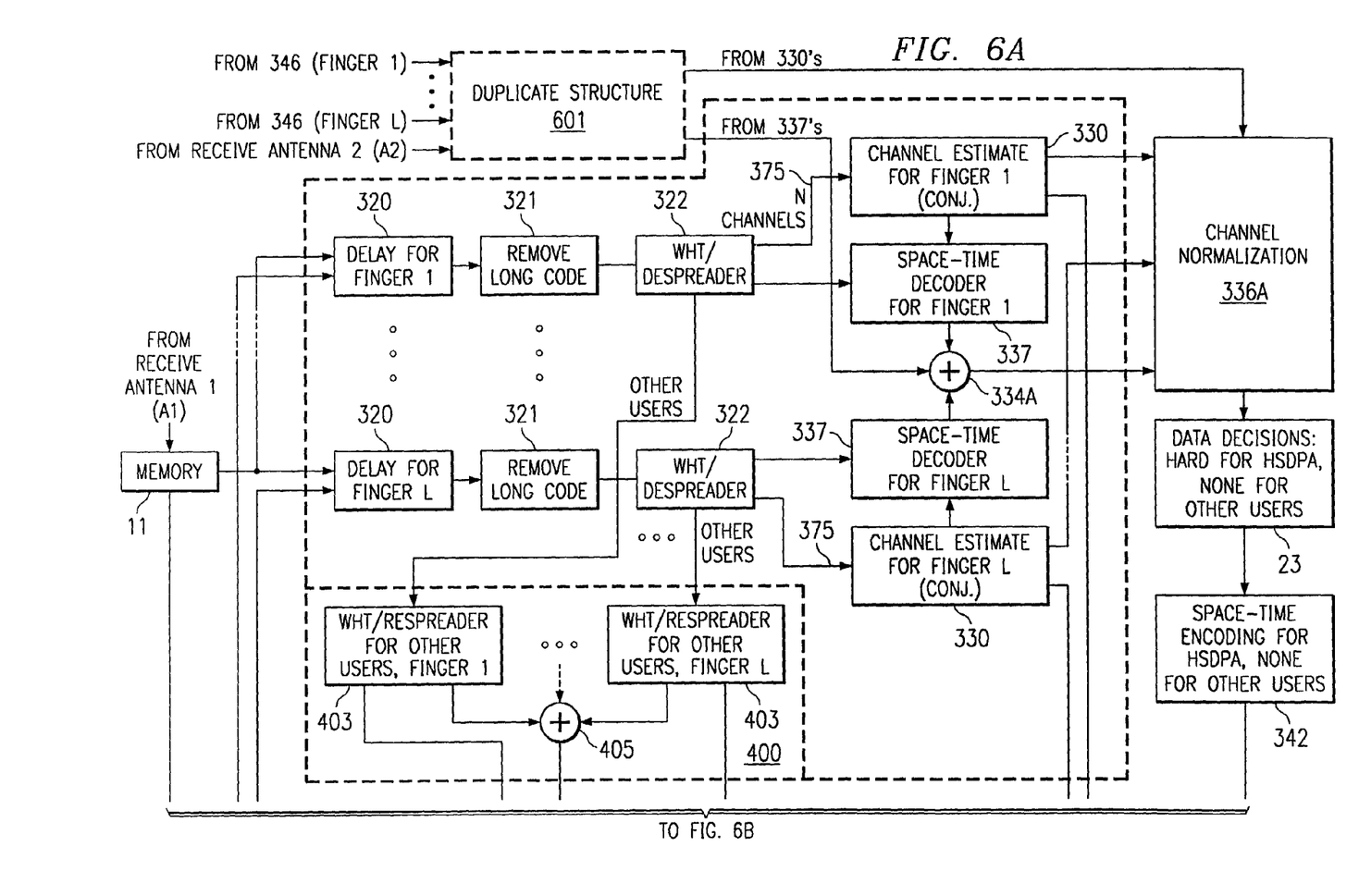
FIG. 6 illustrates an alternative embodiment for MTA-MPIC with two receive antennas and a HSDPA data user.
Figure 6B:
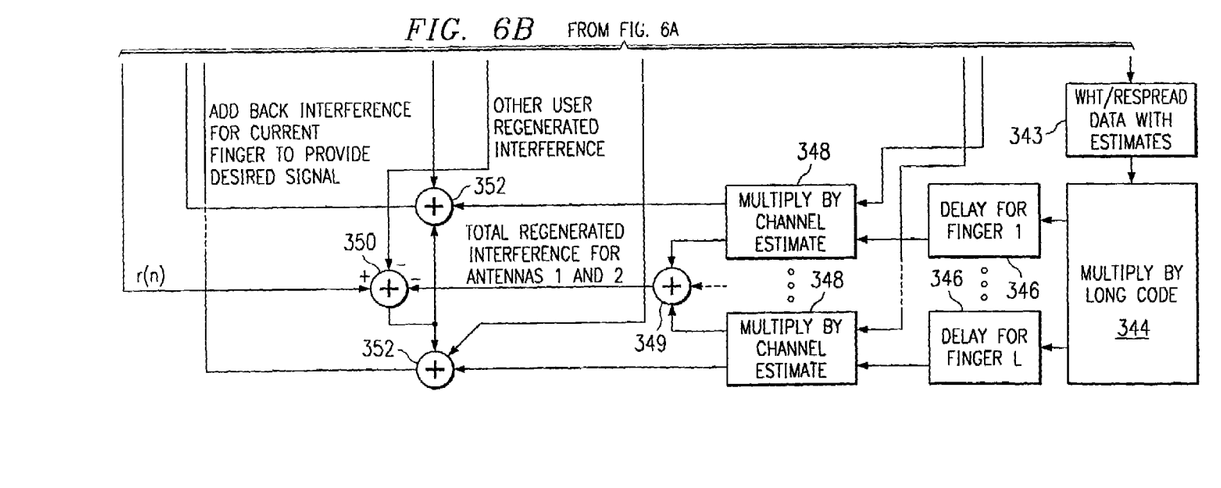

Referring now to FIG. 6 there is illustrated an alternative embodiment, similar to FIG. 4, in which the other user interference is generated directly from despreader outputs, but with two receive antennas A1 and A2. The approach illustrated in FIG. 6 includes some duplicate structure 601 for operation with the second receive antenna (A2). The duplicate structure 601 for antenna A2 duplicates the following structure associated with antenna A1: 11; the 320's; the 321's; the 322's; the 330's; the 337's; the 348's; 349; 350; the 352's; the 403's; 405; and all interconnections therebetween. In duplicate structure 601, as with antenna A1, channels other than HSDPA are tapped before the full combining is determined in the RAKE process. These other users are tapped at the WHT despreaders 322 for each antenna and each delay finger. Subsequently, the other user signals are respread at WHT respreaders 403 and an associated total regenerated interference is summed by adder 405 and then subtracted, along with the HSDPA regenerated interference, from the initial received signal by adder 350. Lastly, the resultant of adder 350 is summed with the respective regenerated interference signals at adders 352 to add back interference from the other users and HSDPA for each delay finger to provide the desired signal. The outputs of all ST decoders 337 of FIG. 6 are summed at 334A, and the result is input to a conventional channel normalizer 336A along with the channel estimate information from all channel estimators 330. The output of channel normalizer 336A is fed into the above-described processing path 23, 342, 343, 344, and 346's, and the outputs of the delays at 346 feed into the corresponding channel estimate multipliers 348 for both A1 and A2.

Figure 5:
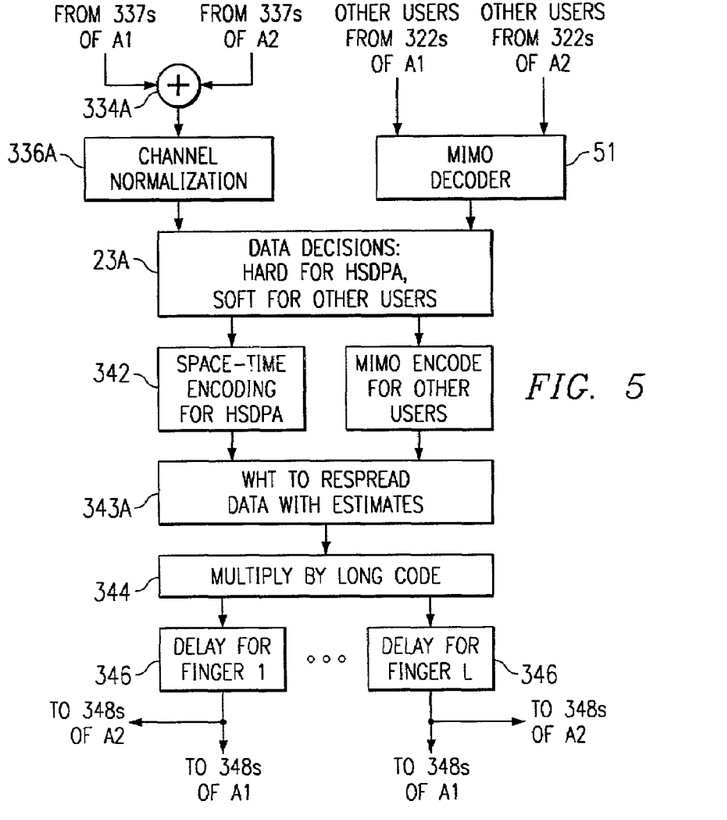
FIG. 5 illustrates a block diagram of MTA-MPIC with two receive antennas and a HSDPA data user.

Referring now to FIG. 5 there are shown pertinent portions of further exemplary embodiments in which two receive antennas are used. The signal contribution of other voice users transmitted from multiple transmit antennas systems are again considered to be independent signals, however, they can be discriminated individually here because the presence of multiple receive antennas enables the individual reception of other voice users transmitted on multiple transmit antenna systems.

The approach illustrated in FIG. 5 is similar to that illustrated in FIG. 3, but with two receive antennas A1 and A2, a MIMO decoder 51 and a MIMO encoder 52. In the FIG. 5 embodiments, the following structure from FIG. 3 is provided for each antenna (designated as A1 and A2): 11; the 320's; the 321's; the 322's; the 330's; the 337's; the 348's; 349; 350; the 352's; and all interconnections therebetween. The channel normalizer 336A in FIG. 5 receives generally the same inputs as in FIG. 6.

In the embodiments of FIG. 5, the other user channels are processed differently.

Let $$\lambda_1^m(i) = \{R_1^m(i), R_2^m(i), \ldots, R_L^m(i)\}; \tilde{M}+1 \leq m \leq M \quad \text{Equation 14}$$

indicate the ensemble of the despread signals for other users from antenna 1.

Similarly define;

$$\lambda_2^m(i) = \{R_1^m(i), R_2^m(i), \ldots, R_L^m(i)\}; \tilde{M}+1 \leq m \leq M \quad \text{Equation 15}$$

which indicates the ensemble of the despread signals for other users from antenna 2.

Figure 7:
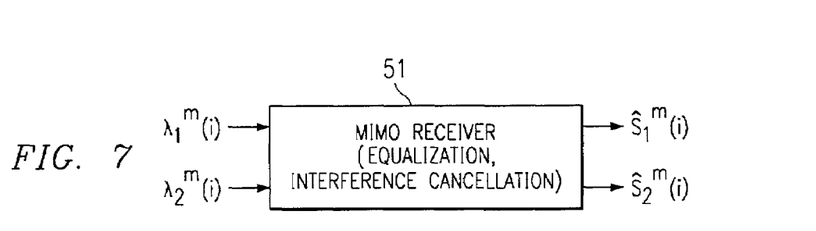
FIG. 7 illustrates a MIMO decoder operation.

Then MIMO equalization and interference cancellation can be used to estimate the composite of the other user signals at spreading gain 16 on antennas 1 and 2 for users $\tilde{M}+1 \leq m \leq M$. An exemplary MIMO decoder is illustrated in FIG. 7.

Conventional MIMO devices, namely minimum mean squared error (MMSE)/zero forcing (ZF) linear equalizers or with decision feedback, can be employed for the MIMO encoder and decoder of FIG. 5. The other user signals are tapped from despreaders 322 in generally the same manner as described above relative to FIGS. 4 and 6. These tapped signals are then input to the MIMO decoder 51. The interference for the other users is then regenerated similar to the interference regeneration for HSDPA users, and is subtracted out from the received signal.

The decision unit 23A produces decisions for both the HSDPA users (based on input from 336A) and the other users (based on input from MIMO decoder 51). The HSDPA user decisions are processed the same as in FIG. 3.

The other user decisions are applied to MIMO encoder 52, which in turn feeds a WHT respreader 343A that applies respreading to both the HSDPA and other signals. From the output of WHT respreader 343A, operations are the same as in FIG. 3, except the delay outputs from the 346's are fed to the corresponding channel estimate multipliers 348 associated with both A1 and A2.

Figure 8:
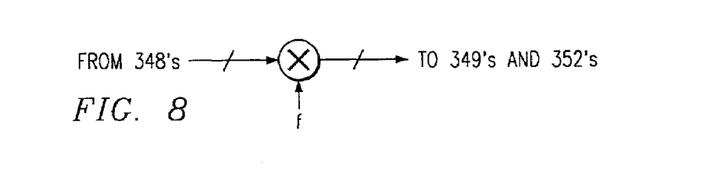
FIG. 8 diagrammatically illustrates pertinent portions of further exemplary embodiments of the invention.

FIG. 8 illustrates exemplary embodiments that utilize a weighting factor f ($0 \leq f \leq 1$) to weight the regenerated interference signals before they are combined with the received signal r(n). In some embodiments, the value of f increases with each iteration of interference regeneration.

Hence the interference cancellation of FIG. 5, in addition to removing the multi-path interference of the HSDPA channels, also removes the multi-path interference due to voice and other users.

The foregoing discussion for HSDPA is similarly applicable to other standards including; IX (CDMA 2000s), proposals for IX-EVDV (1 XTREME, L3QS), space-time spreading (STS) encoding in IX and proposals to IX-EVDV, WCDMA (release '99 and others). Similarly, it can be extended to apply to more than 2 transmit and more than 2 receive antennas and for other transmit techniques such as double-STTD, double-STS and other multiple-input multiple-output (MIMO) techniques.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. An apparatus for processing a composite wireless communication signal including a plurality of multi-path components, comprising:

an input for receiving the composite wireless communication signal from an antenna;

an extraction portion coupled to said input for extracting from the composite wireless communication signal a plurality of signals that respectively correspond to said multi-path components, said extracting portion includes a plurality of delay elements coupled to said input for applying a plurality of delays to said composite wireless communication signal;

a space-time decoder portion coupled to said extraction portion for applying space-time decoding to said plurality of signals to produce a corresponding plurality of space-time decoded signals;

a decision portion coupled to said space-time decoding portion for deciding communication symbols in response to said space-time decoded signals;

a space-time encoding portion coupled to said decision portion for applying space-time encoding to the decided communication symbols to produce a space-time encoded signal;

a multi-path portion coupled to said space-time encoding portion for applying a multi-path effect to said space-time encoded signal to produce a plurality of space-time encoded multi-path signals which respectively correspond to said multi-path components; and a combiner coupled to said multi-path portion and said input for combining said space-time encoded multi-path signals with said composite wireless communication signal to cancel interference from said multi-path components of said composite wireless communication signal.

2. The apparatus of claim 1, wherein said extracting portion includes a despreading portion and wherein said plurality of signals are despread signals.

3. The apparatus of claim 2, wherein said despreading portion includes a long code removing portion and a Walsh-Hadamard transform despreading portion.

4. The apparatus of claim 2, wherein said space-time encoding portion includes a spreading portion coupled to said multi-path portion for applying spreading codes to said space-time encoded signal to make said space-time encoded signal a spread spectrum signal.

5. The apparatus of claim 4, wherein said spreading portion includes a Walsh-Hadamard transform spreading portion and a long code multiplying portion.

6. The apparatus of claim 2, wherein said extracting portion includes a plurality of delay elements coupled between said input and said despreading portion, for applying a plurality of delays to said composite wireless communication signal such that said despreading portion receives variously delayed versions of said composite wireless communication signal.

7. The apparatus of claim 1, wherein said combiner is coupled to said extracting portion for feeding back said interference-cancelled multi-path components to said extracting portion.

8. The apparatus of claim 1, wherein said multi-path portion includes a plurality of delay elements coupled to said space-time encoding portion for applying a plurality of delays to said space-time encoded signal.

9. The apparatus of claim 8, wherein said multi-path portion includes a plurality of channel estimate multipliers coupled to said delay elements for receiving variously delayed versions of said space-time encoded signal, said variously delayed versions of said space-time encoded signal respectively corresponding to said multi-path components of said composite wireless communication signal, each said channel estimate multiplier operable for multiplying the associated version of said space-time encoded signal by a channel estimate corresponding to the associated multi-path component of said composite wireless communication signal.

10. The apparatus of claim 1, wherein said extracting portion is operable for extracting a further plurality of signals that respectively correspond to said multi-path components of said composite wireless communication signal, said combiner coupled to said extracting portion for cancelling interference from said multi-path components respectively in response to the corresponding ones of said further plurality of signals.

11. The apparatus of claim 10, said extracting portion includes a despreading portion, and wherein said further plurality of signals are despread signals.

12. The apparatus of claim 11, including a spreading portion coupled between said extracting portion and said combiner for applying spreading codes to said further plurality of signals to produce a corresponding plurality of spread spectrum signals, said combiner operable for combining said plurality of spread spectrum signals with said plurality of space-time encoded multi-path signals and said composite wireless communication signal to cancel interference from said multi-path components of said composite wireless communication signal.

13. The apparatus of claim 10, wherein said first-mentioned plurality of signals correspond to users that are known to have employed space-time encoding for transmission, and wherein said further plurality of signals correspond to users whose transmission coding is unknown.

14. The apparatus of claim 1, wherein said multi-path portion includes a weighting portion coupled to said combiner for weighting said space-time encoded multi-path signals.

15. An apparatus for processing composite wireless communication signals that each include a plurality of multi-path components, comprising:
 a first input for receiving a first said composite wireless communication signal from a first antenna;
 a second input for receiving a second said composite wireless communication signal from a second antenna;
 a first extraction portion coupled to said first input for extracting from said first composite wireless communication signal a first plurality of signals that respectively correspond to said multi-path components thereof;
 a second extraction portion coupled to said second input for extracting from said second composite wireless communication signal a second plurality of signals that respectively correspond to said multi-path components thereof;
 a first space-time decoder portion coupled to said first extraction portion for applying space-time decoding to said first plurality of signals to produce a corresponding first plurality of space-time decoded signals;
 a second space-time decoder portion coupled to said second extraction portion for applying space-time decoding to said second plurality of signals to produce a corresponding second plurality of space-time decoded signals;
 a decision portion coupled to said first and second space-time decoding portions for deciding first communication symbols in response to said first and second pluralities of space-time decoded signals;
 said first extraction portion operable for extracting from said first composite wireless communication signal a first further plurality of signals that respectively correspond to said multi-path components thereof, and said second extraction portion operable for extracting from said second composite wireless communication signal a second further plurality of signals that respectively correspond to said multi-path components thereof;
 a MIMO decoding portion coupled to said first and second extracting portions for applying a MIMO decoding operation to said first further plurality of signals and said second further plurality of signals;
 said decision portion coupled to said MIMO decoding portion for deciding second communication symbols in response to an output of said MIMO decoding portion;
 a space-time encoding portion coupled to said decision portion for applying space-time encoding to said first communication symbols to produce a space-time encoded signal;
 a MIMO encoding portion coupled to said decision portion for applying MIMO encoding to said second communication symbols to produce a MIMO encoded signal;
 a multi-path portion coupled to said space-time encoding portion and said MIMO encoding portion for applying a multi-path effect to said space-time encoded signal and said MIMO encoded signal to produce first and second pluralities of regenerated multi-path signals which respectively correspond to said multi-path components of said first and second composite wireless communication signals;
 a first combiner coupled to said multi-path portion and said first input for combining said first plurality of regenerated multi-path signals with said first composite wireless communication signal to cancel interference from said multi-path components thereof; and
 a second combiner coupled to said multi-path portion and said second input for combining said second plurality of regenerated multi-path signals with said second composite wireless communication signal to cancel interference from said multi-path components thereof.

16. The apparatus of claim 15, including a spreading portion coupled to said space-time encoding portion and said MIMO encoding portion for applying spreading codes to said space-time encoded signal and said MIMO encoded signal to produce a corresponding spread spectrum signal, said multi-path portion coupled to said spreading portion for applying said multi-path effect to said spread spectrum signal, and wherein said regenerated multi-path signals are spread spectrum signals.

17. The apparatus of claim 15, wherein said first and second pluralities of signals correspond to users that are known to have employed space-time encoding for transmission, and wherein said first and second further pluralities of signals correspond to users whose transmission coding is unknown.

18. A method for processing a composite wireless communication signal including a plurality of multi-path components, comprising:
 extracting from the composite wireless communication signal a plurality of signals that respectively correspond to said multi-path components;
 applying space-time decoding to said plurality of signals to produce a corresponding plurality of space-time decoded signals;
 deciding communication symbols in response to said space-time decoded signals;
 applying space-time encoding to the decided communication symbols to produce a space-time encoded signal;
 applying a multi-path effect to said space-time encoded signal to produce a plurality of space-time encoded multi-path signals which respectively correspond to said multi-path components;

weighting said space-time encoded multi-path signals; and combining said space-time encoded multi-path signals with said composite wireless communication signal to cancel interference from said multi-path components of said composite wireless communication signal.

19. The method of claim 18, including applying space-time decoding to said interference-cancelled multi-path components to produce a corresponding plurality of space-time decoded signals, deciding further communication symbols in response to said last-mentioned space-time decoded signals, applying space-time encoding to said further communication symbols to produce a space-time encoded signal, applying a multi-path effect to said last-mentioned space-time encoded signal to produce a plurality of space-time encoded multi-path signals which respectively correspond to said interference-cancelled multi-path components, and combining said last-mentioned space-time encoded multi-path signals with said composite wireless communication signal to cancel interference from said multi-path components of said composite wireless communication signal.

20. The method of claim 19, including repeating at least once said last-mentioned steps of applying space-time decoding, deciding further communication symbols, applying space-time encoding, applying a multi-path effect, and combining.

21. The method of claim 20, including weighting said space-time encoded multi-path signals by respectively different weights during each said step of applying a multi-path effect.

22. The method of claim 18, wherein said extracting step includes extracting from said composite wireless communication signal a further plurality of signals that respectively correspond to said multi-path components, and including canceling interference from said multi-path components respectively in response to the corresponding ones of said further plurality of signals.

23. The method of claim 22, wherein said first-mentioned plurality of signals correspond to users that are known to have employed space-time encoding for transmission, and wherein said further plurality of signals correspond to users whose transmission coding is unknown.

* * * * *